United States Patent [19]

Umeda et al.

[11] Patent Number: 4,862,196
[45] Date of Patent: Aug. 29, 1989

[54] IMAGE RECORDING APPARATUS

[75] Inventors: Toshikazu Umeda; Shinsuke Funaki; Taketo Nozu, all of Tokyo, Japan

[73] Assignee: Konishiroku Photo Industry Co., Ltd., Tokyo, Japan

[21] Appl. No.: 282,972

[22] Filed: Nov. 28, 1988

Related U.S. Application Data

[63] Continuation of Ser. No. 59,261, Jun. 5, 1987, abandoned.

[30] Foreign Application Priority Data

Jun. 7, 1986 [JP] Japan .................. 61-132174
Dec. 12, 1986 [JP] Japan .................. 61-296054

[51] Int. Cl.⁴ .................. G01D 9/42; H04N 1/46
[52] U.S. Cl. .................. 346/108; 358/75; 358/296
[58] Field of Search .................. 346/108, 107 R, 76 L, 346/160; 358/75, 296, 300, 302, 293, 298

[56] References Cited

U.S. PATENT DOCUMENTS 4,205,350 5/1980 Gunning .................. 358/296
4,467,334 8/1984 Anzai .................. 346/108

Primary Examiner—E. A. Goldberg
Assistant Examiner—Mark Reinhart
Attorney, Agent, or Firm—Finnegan, Henderson, Farabow, Garrett, & Dunner

[57] ABSTRACT

An image recording apparatus wherein a plurality of laser beams are scanned on a color photosensitive material by an optical deflecting device, the laser beams are detected by beam detecting devices, and record starting timings for the laser beams are controlled on the basis of detection signals provided by the detecting devices so that respective record positions of the laser beams are the same.

15 Claims, 12 Drawing Sheets

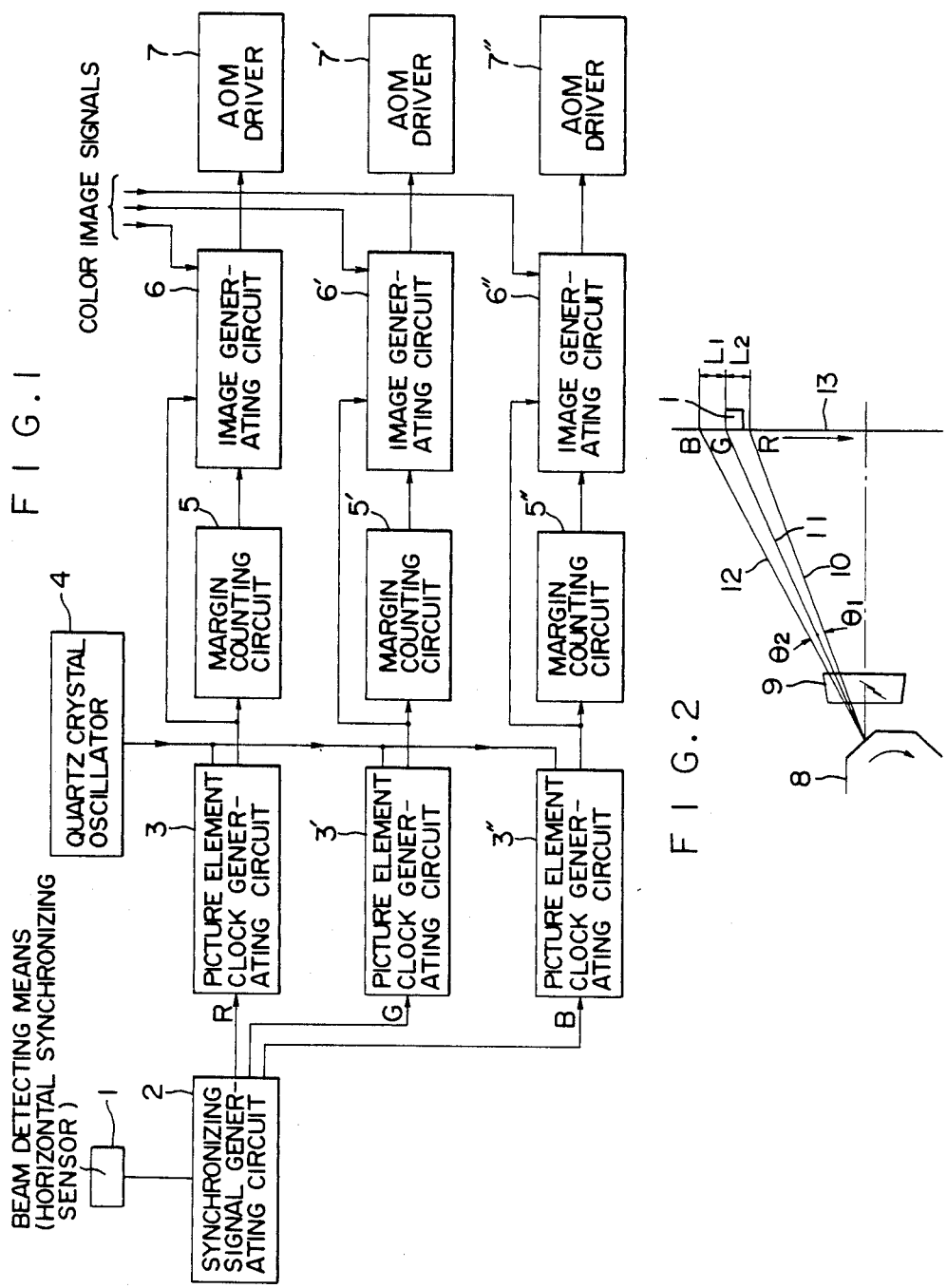

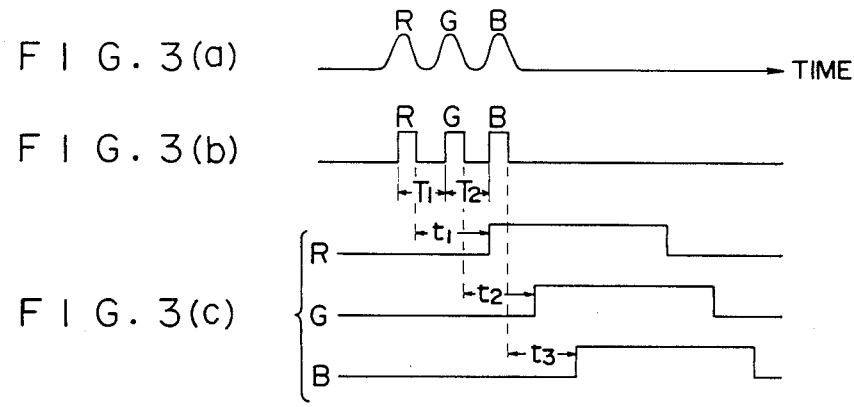
FIG. 3(a)
FIG. 3(b)
FIG. 3(c)
PRIOR ART FIG. 4
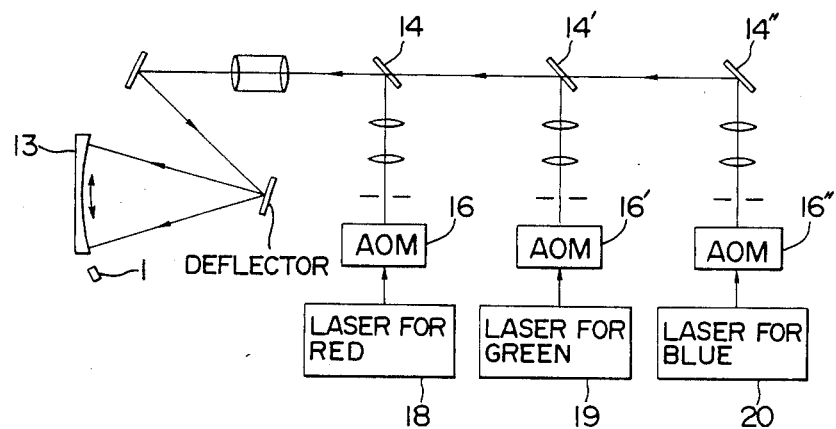
PRIOR ART FIG. 5
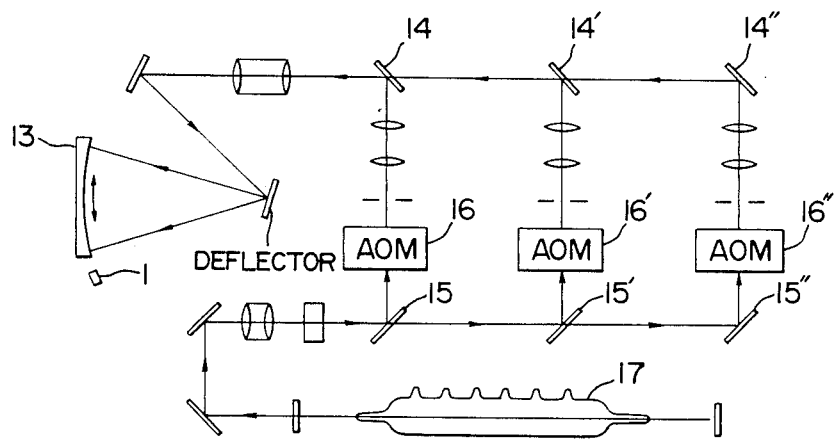

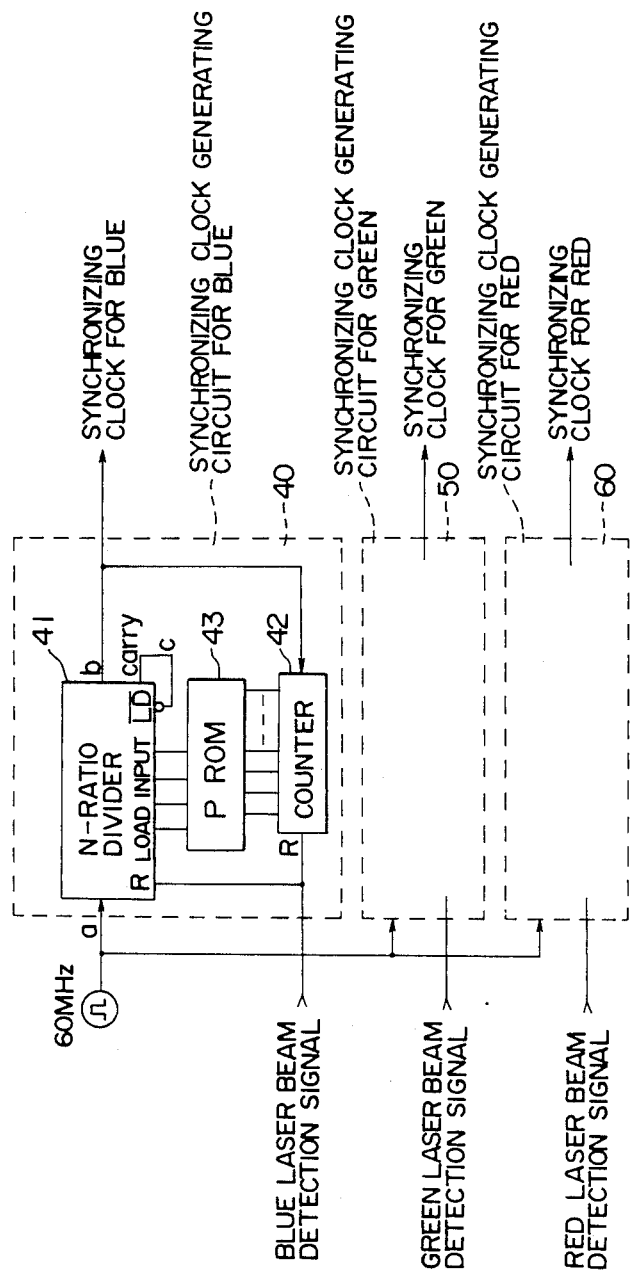

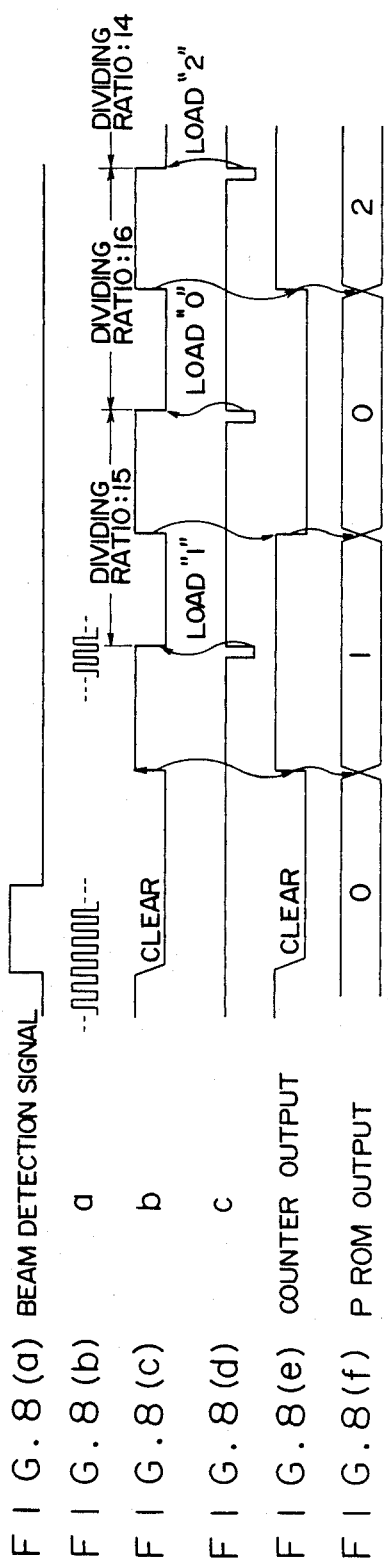
FIG. 8(a) BEAM DETECTION SIGNAL
FIG. 8(b) a
FIG. 8(c) b
FIG. 8(d) c
FIG. 8(e) COUNTER OUTPUT
FIG. 8(f) P ROM OUTPUT
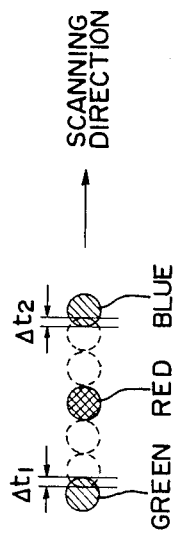
FIG. 9

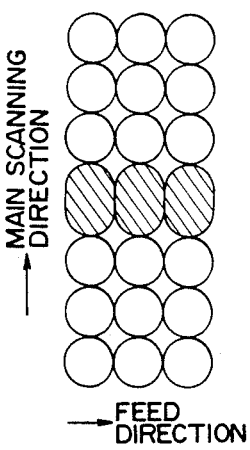
F I G . 11
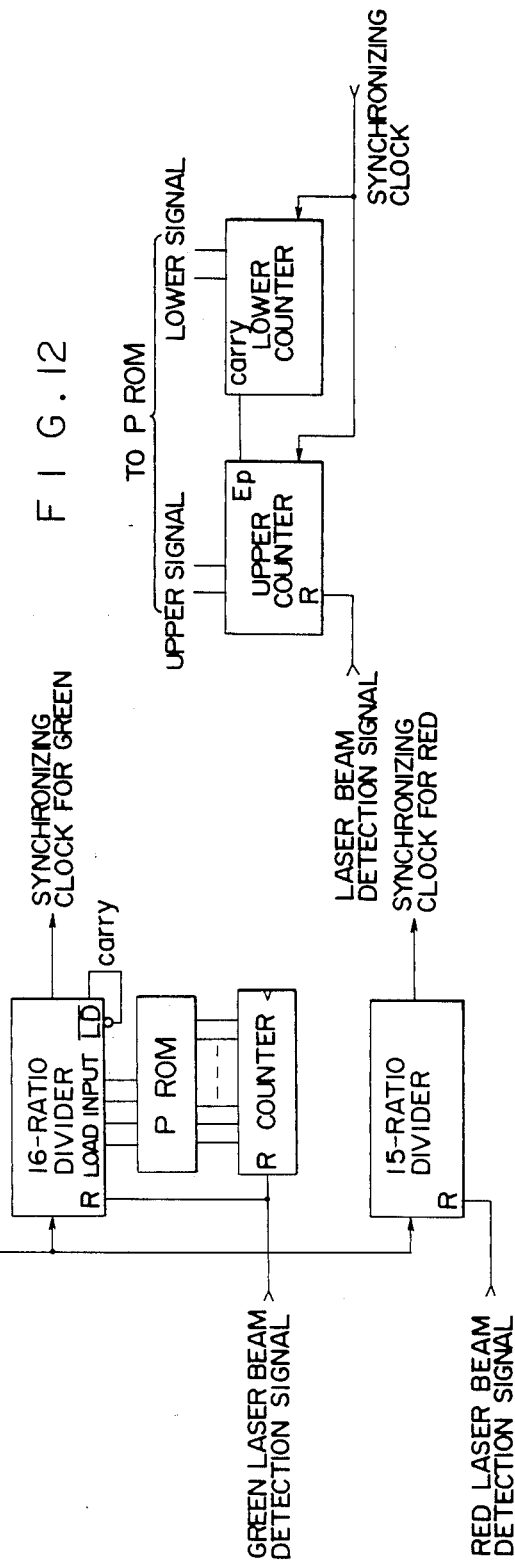
F I G . 12
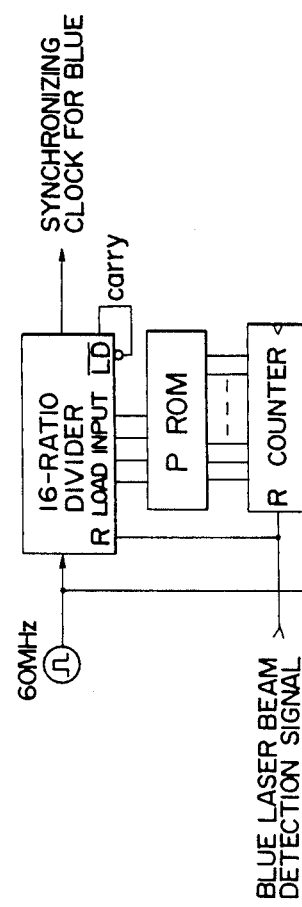
F I G . 10

FIG. 13
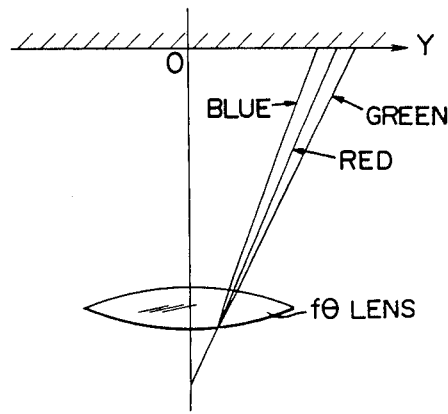
FIG. 15 PRIOR ART
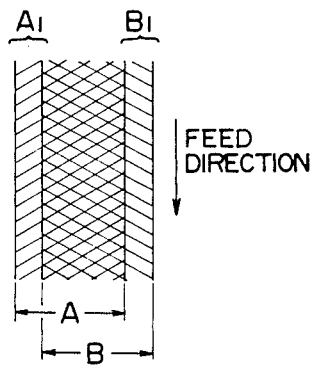
PRIOR ART FIG. 14
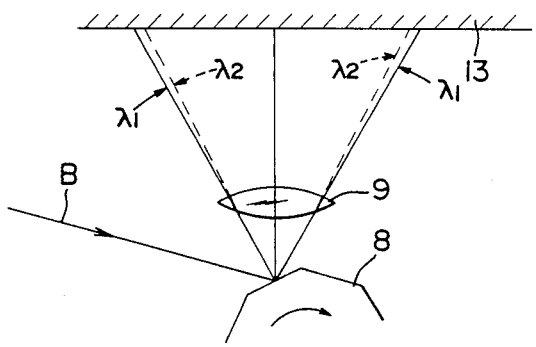
PRIOR ART FIG. 16
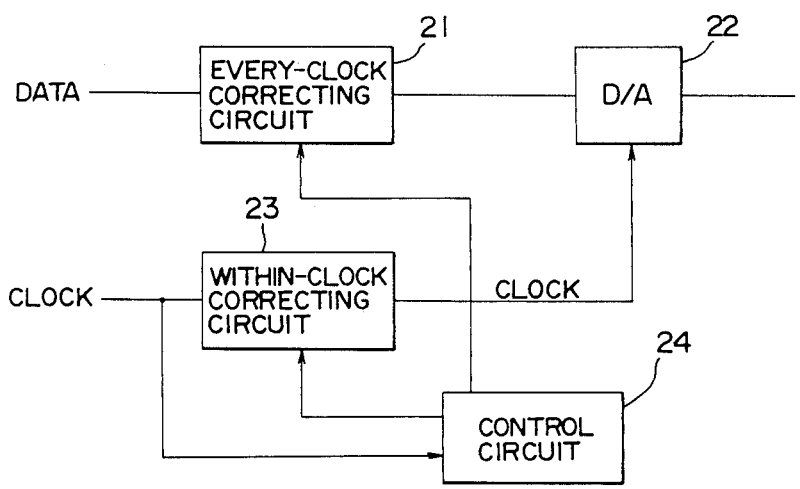

PRIOR ART FIG. 17
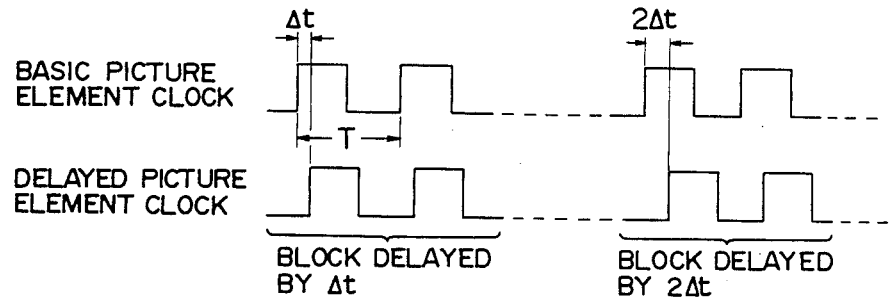
PRIOR ART FIG. 18
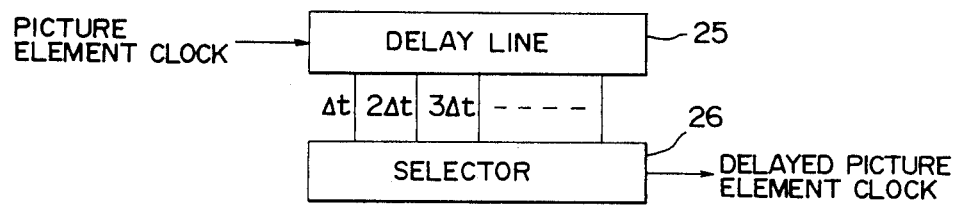
FIG. 19(a)
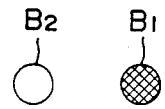
FIG. 19(b)
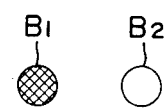
→ SCANNING DIRECTION
FIG. 20
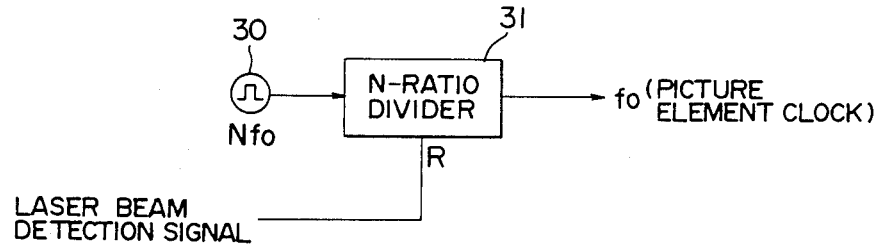

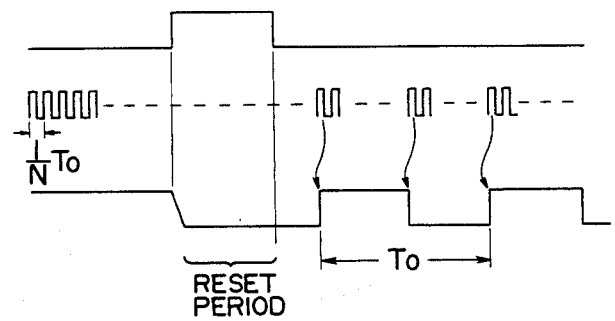
FIG. 21(a)
FIG. 21(b)
FIG. 21(c)
FIG. 22
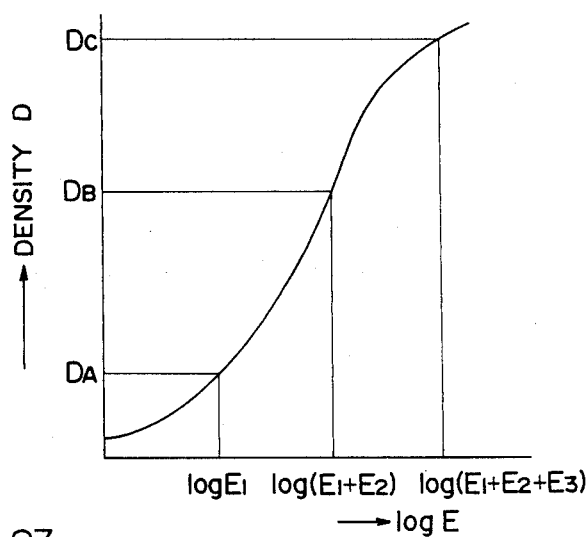
FIG. 23
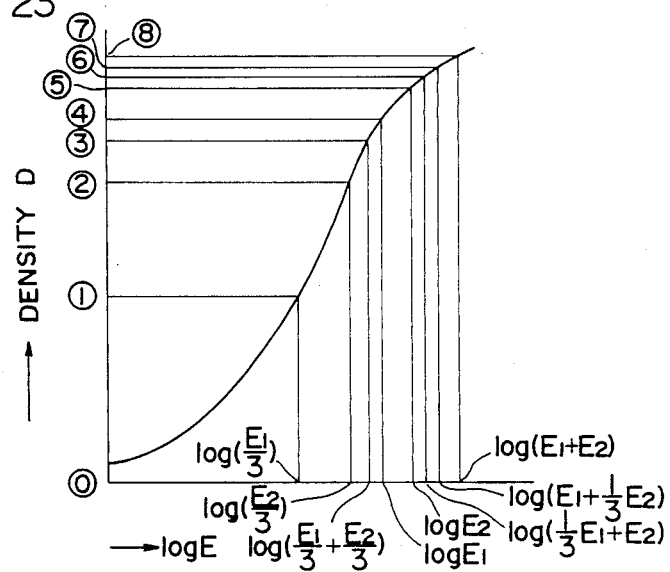

IMAGE RECORDING APPARATUS

BACKGROUND OF THE INVENTION

1. Field of the Invention

The present invention relates to improvements in correcting the misalignment of the three laser beams of three primary colors in a color laser image recording apparatus.

2. Description of the Prior Art

Laser printers record image information by modulating a laser beam according to image signals, and irradiating an image recording medium through an optical system by the modulated laser beam for exposure scanning.

FIGS. 4 and 5 show the respective basic constitutions of two conventional color laser printers. The color laser printer shown in FIG. 4 is of a three-tube type employing three lasers, namely, a laser 18 for red (hereinafter referred to as "R-laser"), a laser 19 for green (hereinafter referred to as "G-laser") and a laser 20 for blue (hereinafter referred to as "B-laser"), as the light source. The color laser printer shown in FIG. 5 is of a single-tube type employing a single He-Cd white-light laser 17 capable of emitting white laser light containing three primary color laser beams, namely, a R-laser beam, a G-laser beam and a B-laser beam.

In the three-tube type color laser printer, color laser beams emitted from the lasers are modulated by acoustooptic modulators (hereinafter referred to as "AOMs") 16, 16' and 16" for the three colors by color image signals, and then the modulated color laser beams, are reflected by dichroic mirrors 14, 14' and 14", respectively, disposed so as to collect the three color laser beams in a single laser beam. The single laser beam travels through an optical system and is deflected by a deflector for scanning operation to form a color image on the surface of a photosensitive material 13.

In the single-tube type color laser printer, the single laser emits R-laser beam, G-laser beam and B-laser beam in a single laser beam. However, the component color laser beams need individual intensity modulation by the corresponding color image signals. Accordingly, the laser beam is decomposed into a R-laser beam, a G-laser beam and a B-laser beam with dichroic mirrors 15, 15' and 15". The rest of the constitution is the same as that of the three-tube type color laser printer.

In either conventional color laser printer, the three modulated color laser beams need to be collected in a single beam and to fall on a focal plane in a single spot. A sensor (beam detecting means) 1 which provides a horizontal synchronizing signal is provided before an image write starting point on the focal plane. Image write starting timing is determined by a synchronizing signal produced from the detection signal of the detection signal provided by the sensor 1.

FIGS. 6(a) to 6(c) are time charts showing a mode of synchronized scanning. FIG. 6(a) shows the waveform of the output signal of the horizontal synchronizing sensor 1, FIG. 6(b) shows a scanning synchronizing signal obtained by shaping the signal shown in FIG. 6(a), and FIG. 6(c) shows the timing and period of image write scanning.

In the conventional color laser printer, it has been difficult to collect three laser beams in a single laser beam so that the single laser beam will fall on the focal plane in a single spot. To make the three color laser beams fall on the focal plane in a perfect single spot, the three color laser beams need to be collected perfectly in a single laser beam at a very high accuracy by the dichroic mirrors 14, 14' and 14" (FIGS. 4 and 5). For example, when the diameter of the spot on the focal plane is 80 μm, the focal length of the fθ lens is 200 mm and the allowable color beam deviation is a quarter of a dot, error in the respective angles of the dichroic mirrors 14, 14' and 14" (FIGS. 4 and 5) must be 1/180° (20") or below, which requires a highly accurate dichroic mirror setting mechanism and highly skilled work and much time in setting and adjusting the dichroic mirrors.

Furthermore, in the color laser printer capable of multicolor recording through exposure scanning by means of a plurality of laser beams of different wavelengths such as a R-laser beam, a G-laser beam and a B-laser beam, the deviation of the spots of the laser beams on the focal plane attributable to chromatic aberration caused by the focusing lens, namely, the fθ lens, is a problem. Suppose that a laser beam B including laser rays of $\lambda_1$ and $\lambda_2$ in wavelength, respectively, is reflected by a polygonal rotating mirror 8 and is projected through the fθ lens 9 on a focal plane in a recording medium or a photosensitive material 13 as illustrated in FIG. 14. Then, the respective spots of the laser beam of $\lambda_1$ and the laser beam of $\lambda_2$ in wavelength are discrepant from each other due to color aberration caused by the fθ lens 9 as indicated continuous lines for the laser beam of $\lambda_1$ and by broken lines for the laser beam of $\lambda_2$ in wavelength in FIG. 14. Such discrepancy between the spots of the laser beams causes color spot deviation on the recording medium 13, which deteriorates the quality of the image, and the expansion of the spot reduces the resolution of the color laser printer. FIG. 15 illustrates a mode of color spot deviation diagrammatically. For example, a region A is irradiated by the laser beam of $\lambda_1$ in wavelength while a region B is irradiated by the laser beam of $\lambda_2$ in wavelength. Then, regions $A_1$ and $B_1$ are color deviation regions increasing the apparent width of a line scanned by the laser beam.

To obviate such a problem attributable to chromatic aberration, the following measures are taken.

(1) Employment of a perfect achromatic lens as the fθ lens (focusing lens).

(2) Correction of chromatic aberration by delaying the picture element clock. The correction is achieved through every-clock correction and within-clock correction. That is, data is delayed for every-clock correction while a clock for a D/A (digital-to-analog) converter is delayed for within-clock correction.

Referring to FIG. 16 showing a chromatic aberration correcting circuit, image data is given through a every-clock correcting circuit 21 to the D/A converter 22, and a picture element clock is given as a conversion clock through a within-clock correcting circuit 23 to the D/A converter 22. The every-clock correcting circuit 21 and the within-clock correcting circuit 23 are controlled by a control circuit 24. The control circuit 24 delays the data by controlling a clock to be given to the every-clock correcting circuit 21 for every-clock correction. On the other hand, the control circuit 24 controls the within-clock correcting circuit 23 to delay the conversion clock to be given from the within-clock correcting circuit 23 to the D/A converter 22 for within-clock correction.

The measure described in article (1) is impossible because no perfectly achromatized lens for three of more light rays of different wavelengths is available. Even an achromatized lens for two light rays of different wavelengths requires special materials for forming the same and highly accurate assembling. Accordingly, the yield of a process for manufacturing such an $f\theta$ lens is low and hence such an $f\theta$ lens is costly.

To execute the measure described in article (2), a beam deviated from a correct position due to chromatic aberration needs to be moved to the correct position through fine adjustment because the picture element clock is fixed. Referring to FIG. 17, suppose that a unit delay time of a delayed picture element clock from a basic picture element clock is $\Delta t$, then the respective delay times of the successive blocks are $2\Delta t, 3\Delta t, \ldots$, respectively, sequentially increasing by an increment of $\Delta t$. Accordingly, the correcting circuit 23 needs elements capable of increasing the delay time up to a period T by an increment of $\Delta t$ such as, for example, a delay line and a selector 26 capable of sequentially selecting delayed clocks delayed by the delay line.

Referring to FIG. 18 showing an exemplary delay circuit, clocks given to a delay line 25 is delayed sequentially up to a delay time T by an increment of $\Delta t$. The delayed picture element clocks are selected by a selector 26 and an optimum delayed picture element clock is provided for every block. However, the delay line is expensive, for example, 4000 yen for a piece of 8-tap delay line, and the accuracy of the delay line, for example, $\Delta t \pm 5\%$, is not satisfactory. Furthermore, this method is able to shift the focal position backward by delaying the picture element clock, but is unable to shift the focal position forward.

SUMMARY OF THE INVENTION

It is therefore an object of the present invention to provide an image recording apparatus capable of highly accurately correcting the deviation of the respective spots of three laser beams for three colors, respectively, through simple means.

To achieve the foregoing object of the invention, the present invention provides an image recording apparatus comprising: a single optical deflecting means for scanning a plurality of laser beams separated on a record scanning surface; one or more beam detecting means for detecting the plurality of laser beams, respectively; and control means for controlling record starting timings for the plurality of laser beams on the basis of detection signals provided by the beam detecting means so that respective record starting positions of the plurality of laser beams are the same.

The present invention provides further a laser image recording apparatus for recording a color image on a color photosensitive material by the simultaneous scanning operation of a plurality of laser beams of different wavelengths separated along a scanning direction, which comprises: one or more beam detecting means corresponding to a plurality of laser beams; a synchronizing signal generating circuit which, upon the reception of a beam detection signal from the beam detecting means, provides a waveform-shaped scanning synchronizing signal for each one of the laser beams of different wavelengths; a plurality of picture element clock generating circuits which receive the scanning synchronizing signal and a clock signal of a frequency which is an integral multiple of the frequency of a predetermined picture element clock signal, and then divide the clock signal from the time of reception of the scanning synchronizing signal to provide picture element clock signals, respectively; a plurality of margin counting circuits which receive the picture element clock signals from the picture element clock signal generating circuits, respectively, and provide count completion signals, respectively, at the completion of counting a predetermined number of picture elements; and a plurality of image generating circuits which generate images upon the reception of the count completion signals from the counting circuits, respectively, and give the images to drivers which modulate the respective intensities of the plurality of laser beams, respectively.

The laser image recording apparatus according to the present invention is adapted for operation on an assumption that a plurality of laser beams of different wavelengths are separated from each other in a scanning direction. The term "separation" implies the partially overlapping separation of the respective spots of the laser beams allowing the beam detecting means to discriminate overlapping spots of the laser beams on a focal plane as well as the complete separation of the respective spots of the laser beams on a focal plane. In the following description, the number of the laser beams is supposed to be three for convenience' sake.

The function of the laser image recording apparatus of the present invention will be described hereinafter on an assumption that the laser image recording apparatus is provided with a single beam detecting means.

The respective image write starting positions of the three laser beams on the focal plane of a photosensitive recording medium must be the same. When the three laser beams are the same in scanning speed, the length of time required for each of the three laser beams to arrive at the image write starting position after passing the beam detecting means is the same for all the laser beams irrespective of intervals between the three laser beams. Accordingly, all the laser beams start writing an image at the same position when the modulation of an AOM driver corresponding to each laser beam by a color image signal corresponding to each laser beam is started after a predetermined time has passed from the detection of passage of each laser beam across the beam detecting means, and hence deviation of the spots does not appear in an image recorded on the photosensitive recording medium even if the laser beams are separated from each other.

Now, the function of the laser image recording apparatus of the present invention will be described hereinafter on an assumption that the laser image recording apparatus is provided with three beam detecting means for three laser beams, respectively.

Since the three beam detecting means are disposed at different distances from the image write starting position, respectively, the three beams arrive at the image write starting position in different lengths of time, respectively, after passing by the corresponding beam detecting means. Accordingly, the three laser beams can be made to start writing an image at the same image write starting position when the respective lengths of time in which the modulation of the AOM drivers by the corresponding color image signals is started after the three laser beams have passed the corresponding beam detecting means are different from each other.

When a single beam detecting means is provided for three laser beams, the beam detecting means provides a detection signal upon the passage of each laser beam by the beam detecting means. When three beam detecting means are provided for three laser beams, respectively, each beam detecting means provides a detection signal upon the passage of the corresponding laser beam by the beam detecting means. In either case, the detection signal is applied to the synchronizing signal generator, and then the synchronizing signal generator provides a scanning synchronizing signal having a waveform shaped for the color (wavelength) of each laser beam. The scanning synchronizing signal for each color laser beam is given to a picture element clock generating circuit for the color laser beam. At the same time, a signal for clock of a frequency which is an integral multiple of the frequency of a picture element clock generated by a stable oscillator is applied to the picture element clock generating circuit. Each picture element clock generating circuit divides the signal for clock from a moment when the scanning synchronizing signal is given thereto and generates a picture element clock signal. The higher the frequency of the signal for clock, the smaller the time difference between the scanning synchronizing signal and the first signal of the picture element clock signal.

The picture element clock signal is given to a counting circuit connected to each picture element clock generating circuit. The counting circuit counts the pulses of the picture element clock signal by a predetermined count and, upon the completion of counting the predetermined number of pulses, provides a count completion signal. The length of time required for counting the predetermined number of the picture element clock signal corresponds to the foregoing predetermined time. Therefore, when only a single beam detecting means is provided, all the counting circuits are set for the same count. When three beam detecting means are provided for the three laser beams, the counting circuits are set for different counts, respectively.

The count completion signal generated by the counting circuit is given to an image generating circuit connected thereto. Then, the image generating circuit generates a an image upon the reception of the count completion signal and gives the image to an AOM driver connected thereto. Upon the reception of the image, the AOM driver starts amplitude modulation on the basis of a corresponding color image signal, and then gives a modulated high-frequency signal to a corresponding AOM. Thus, the laser beams start writing an image at the same image write starting position on a photosensitive recording medium even if the different color laser beams are not collected in a single beam, so that deviation of the spots does not appear in the recorded image.

Deviation of the spots in the image recorded on the photosensitive recording medium may appear due to the time difference between the scanning synchronizing signal and the first pulse of the picture element clock signal. However, since the maximum time difference is equal to the value resulting from the division of the period of the picture element signal by the dividing ratio, the chromatic aberration of the picture element is equal to the value resulting from the division of the size of a single dot by the dividing ratio, for example, one eighth of the size of a dot when the dividing ratio is eight and one sixteenth of the size of a dot when the dividing ratio is sixteen. Accordingly, when the frequency of the clock signal is sufficiently high, the deviation of the spots attributable to the time difference is negligible.

Another object of the present invention is to provide a laser image recording apparatus capable of shifting a focal position in a scanning direction without using any expensive delay line.

To achieve the object of the invention, the present invention provides a laser image recording apparatus capable of modulating a plurality of laser beams of different wavelengths according to image information, and scanning an image recording medium by the modulated laser beams through deflecting means and a focusing optical system to form an image on the image recording medium, which comprises memory means for storing laser beam dividing information, and a divider capable of operating at variable dividing ratio corresponding to the output of the memory means and provides an output for modulating the image information.

The picture element clock dividing ratio is varied, namely, the number of pulses of the picture element clock is increased or decreased, on the basis of laser beam dividing ratio previously stored in the memory means to advance or delay the picture element clock, so that all the patterns of deviation of the spots can be corrected.

A method of correcting deviation of the spots will be described hereinafter with reference to FIGS. 19(a) and 19(b). In FIGS. 19(a) and 19(b), indicated at $B_1$ and $B_2$ are the correct spot position and deviated spot position, respectively, of a laser beam on an image recording medium. In FIG. 19(a), the deviated spot position $B_2$ is on the rear of the correct spot position $B_1$ due to chromatic aberration while, in FIG. 19(b), the actual spot $B_1$ due to deviation of the spots.

The picture element clock is delayed, namely, the dividing ratio N is increased, to correct the deviated spot position shown in FIG. 19(a), while the picture element clock is advanced, namely, the dividing ratio is decreased, to correct the deviated spot position shown in FIG. 19(b). To enable such a deviated spot position correction, a basic picture element clock is produced, and then the pulses of the basic picture element clock is increased or decreased.

(1) Process of basic picture element production:

To form an image not having jitters, image data is read in synchronism with signals provided by a beam detector disposed near a scanning starting position outside a recording area, for which a picture element clock synchronous with the output signal of the beam detector needs to be generated. Generally, such a picture element clock is generated by dividing the output signal of an oscillator of a frequency which is N times the frequency of a picture element clock by a dividing ratio of N when the beam detector provides an output signal. Accordingly, theoretically, jitters corresponding to 1/N of the size of a dot is inevitable. However, when N is sufficiently large, such jitters are negligible. FIG. 20 is a block diagram of a picture element clock generating circuit, and FIGS. 21(a) to 21(c) are time charts showing a mode of sequential operation of the components of the picture element clock generating circuit.

An oscillator 30 gives a clock of $Nf_0$ in frequency as shown in FIG. 21(b) to an N-ratio divider 31. While a position detection signal as shown in FIG. 21(a) is given as a reset signal R by the beam detector to the N-ratio divider 31, the output of the N-ratio divider 31 is reset. Upon the termination of the reset signal R, the N-ratio divider 31 starts dividing operation to provide a basic picture element clock of $f_0$ in frequency and $T_0$ in period as shown in FIG. 21(c).

(2) Basic picture element clock regulation:

Referring to FIG. 20, the frequency $f_0$ of the basic picture element clock can be regulated by varying the dividing ratio N. For example, a dividing ratio is chosen among three dividing ratios $N_1$, $N_2$ and $N_3$ ($N_1 < N_2 < N_3$) When the picture element clock needs delaying, the high dividing ratio $N_3$ is chosen to increase the period $T_0$ of the clock and, when the picture element clock needs advancing, the low dividing ratio $N_1$ is chosen to decrease the period $T_0$ of the clock. Thus, an optional clock synchronizing pattern is produced by regulating the dividing ratio. Suppose that the frequency of the picture element clock is $f_0$ when the dividing ratio is $N_2$. Then, the frequency of the picture element is increased to $(N_2/N_1) \times f_0$ when the dividing ratio is changed from $N_2$ to $N_1$, while the frequency of the picture element is decreased to $(N_2/N_3) \times f_0$ when the dividing ratio is changed from $N_2$ to $N_3$.

The above and other objects, features and advantages of the present invention will become apparent from the following description taken in conjunction with the accompanying drawings.

BRIEF DESCRIPTION OF THE DRAWINGS

FIG. 1 is a block diagram of an image recording apparatus, in a first embodiment, according to the present invention;

FIG. 2 is a view showing the deviation of the spots of color laser beams;

FIGS. 3(a) to 3(c) are time charts showing relation between a scanning synchronizing signal and image write starting timing;

FIG. 4 is a block diagram showing the constitution of a conventional three-tube color laser printer;

FIG. 5 is a block diagram showing the constitution of a conventional color laser printer;

FIGS. 6(a) to 6(c) are time charts showing the relation between scanning synchronizing signal and image write starting timing in a conventional image recording apparatus;

FIG. 7 is a block diagram showing the constitution of the essential portion of an image recording apparatus, in a second embodiment, according to the present invention;

FIGS. 8(a) to 8(f) are time charts of assistance in explaining the respective functions of the components of the image recording apparatus of FIG. 7;

FIG. 9 is an illustration showing the respective relative positions of the respective spots of color beams;

FIG. 10 is a block diagram showing the constitution of the essential portion of an image recording apparatus, in a third embodiment, according to the present invention;

FIG. 11 is an illustration showing the irregularity of spots of beams along the feed direction;

FIG. 12 is block diagram showing the constitution of a counter;

FIG. 13 is an illustration of assistance in explaining deviation of the spots;

FIG. 14 a diagrammatic illustration of assistance in explaining, a mode of chromatic aberration;

FIG. 15 is a view showing chromatic aberration in a recorded image;

FIG. 16 is a block diagram of an exemplary deviation of the spots correcting circuit;

FIG. 17 is a time chart of assistance in explaining a manner of delaying a picture element clock;

FIG. 18 a block diagram of a picture element clock delaying circuit a delay line;

FIGS. 19(a) and 19(b) views of assistance in explaining the principle of deviation of the spots correction:

FIG. 20 is a view of assistance in explaining a manner of producing a picture element clock;

FIGS. 21(a) to 21(c) are time charts showing signals provided by the manner of producing a picture element clock of FIG. 20;

FIGS. 22 and 23 are graphs showing the relation between a laser light source and a photosensitive recording medium;

DESCRIPTION OF THE PREFERRED EMBODIMENTS

Figure 24:
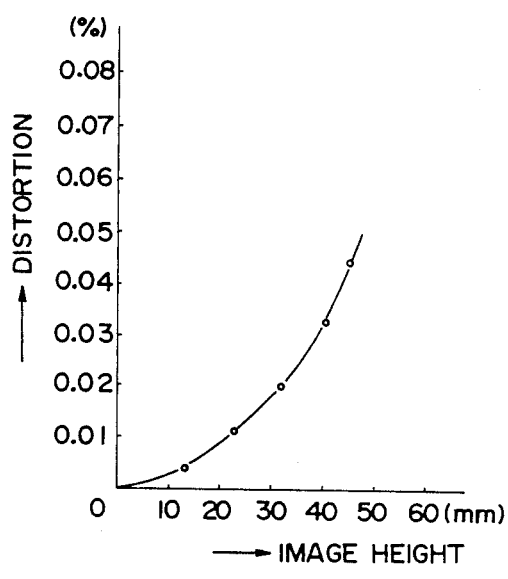
FIG. 24 is a graph showing the relation between the distortion height of an $f\theta$ lens.

FIG. 1 shows an image recording apparatus, in a first embodiment, according to the present invention, and FIG. 2 shows a mode of scanning a photosensitive recording medium 13 by deviating laser beams. A horizontal synchronizing sensor 1 for detecting the passage of laser beams is disposed in the left margin (in the upper side as viewed in FIG. 2) of the photosensitive recording medium 13. An R-laser beam 10 for red, a G-laser beam 11 for green and a B-laser beam 12 for blue turn across the horizontal synchronizing sensor 1 to start scanning the photosensitive recording medium 13.

Upon the passage of the R-laser beam 10, the G-laser beam 11 and the B-laser beam 12 across the horizontal synchronizing sensor 1, the horizontal synchronizing sensor 1 provides a beam detection signal as shown in FIG. 3(a). The beam detection signal is subjected to waveform shaping in a synchronizing signal generating circuit 2 to provide scanning synchronizing signals R, G and B for the R-laser beam, the G-laser beam and the B-laser beam, respectively, as shown in FIG. 3(b). The scanning synchronizing signals R, G and B are applied to picture element clock generating circuits 3, 3' and 3'', respectively. At the same time, a quartz crystal oscillator 4 applies a clock signal of a frequency which is an integral multiple of a predetermined picture element clock frequency, for example, a frequency eight or sixteen times the predetermined picture element clock frequency, to the picture element clock generating circuits 3, 3' and 3''.

Upon the reception of the horizontal synchronizing signal, the picture element clock signal generating circuits 3, 3' and 3''start dividing the clock signal to generate picture element clock signals. Then, the picture element clock signals generated by the picture element clock signal generating circuits 3, 3' and 3'' are given to margin counting circuits 5, 5' and 5'', respectively. Each counting circuit counts the pulses of the picture element clock signal corresponding to the distance between the horizontal synchronizing sensor 1 and the image write starting position on the photosensitive recording medium 13. Upon the completion of counting the pulses of the picture element clock signal, the counting circuit 5, 5' and 5" give count completion signals to image generating circuits 6, 6' and 6", respectively. Then, the image generating circuits 6, 6' and 6" give color image signals to AOM drivers 7, 7' and 7", respectively. In this embodiment, each image generating circuit generates the picture element clock through the AND operation of the count completion signal given thereto from the counting circuit and the picture element clock signal given thereto from the picture element clock generating circuit. While a color image signal is applied to the AOM driver, the AOM driver modulates the amplitude of a high-frequency signal for a fixed time from the moment of reception of the image as shown in FIG. 3(c). When only one horizontal synchronizing sensor 1 is provided, $t_1 = t_2 = t_3$. When three horizontal synchronizing sensors 1 are provided for the three laser beams, the values of $t_1$, $t_2$ and $t_3$ are dependent on the respective distances of the horizontal synchronizing sensors from the image write starting position, respectively. Provision of three horizontal synchronizing sensors requires more troublesome adjustment of the set values of the counting circuits than that required when only one horizontal synchronizing sensor is provided. However, when three horizontal synchronizing sensors are provided, the synchronizing signal generating circuit need not be provided with any discriminating circuit for discriminating the synchronizing signals for the R-laser beam, the G-laser beam and the B-laser beam.

Dichroic mirrors or filters may be employed to make the three color laser beams fall separately on the three horizontal synchronizing sensors, respectively.

In the first embodiment of the present invention, since the scanning distance between the fixed horizontal synchronizing sensor (beam detecting means) and the image write starting position on the photosensitive recording medium is fixed as mentioned above, the image write operation of each laser beam is started in a time corresponding to the scanning distance after the laser beam has passed across the horizontal synchronizing sensor. Therefore, all the laser beams start writing an image at the same image write starting position at a fixed distance from the horizontal synchronizing sensor regardless of the magnitude of the relative deviation between the laser beams and the sequence of the laser beams even if the laser beams are not collected in a single beam and travel in separate color laser beams, provided that the horizontal synchronizing sensor is capable of discriminating the laser beams, so that deviation of the spots does not appear on the photosensitive recording medium.

When three horizontal synchronizing sensors are provided for the three laser beams, respectively, a length of time in which each laser beam starts writing an image after passing across the corresponding horizontal synchronizing sensor is determined according to the scanning distance between the corresponding horizontal synchronizing sensor and the image write starting position, so that all the laser beams start writing an image at the same image write starting position on a photosensitive recording medium to obviate deviation of the spots on the photosensitive recording medium.

A. When lasers which emit laser beams of the same wavelength are employed as light sources, the image recording apparatus has the following advantages.

(1) An image is formed in a sufficiently high density even if each laser is of a small capacity by the duplicate recording effect of the laser beams. When He-Ne lasers which emit a laser beam having a wavelength of 632.8 nm are used as the lasers shown in FIG. 4, a photosensitive material sensitive to such a laser beam is used. The photosensitive material may be a silver halide photography or a photosensitive material for electrophotography, having characteristics as shown in FIG. 22, in which log E (E is total exposure) is measured on the horizontal axis, while the optical density of a silver halide photography or voltage of photosensitive material for electrophotography is measured on the vertical axis. As is obvious from FIG. 22, an exposure $E_1$ by the first laser gives a density $D_A$; an additional exposure $E_2$ by the second laser increases the density to a density $D_B$; further additional exposure $E_3$ by the third laser increases the density to a density $D_C$.

(2) Forming an image in a number of degrees of gradation greater than the number of input data modulation levels is possible.

All the lasers shown in FIG. 4 are He-Ne lasers which emit a laser beam having a wavelength of 632.8 nm, and a photosensitive material sensitive to such a laser beam is used.

In the case of FIG. 5, the same He-Ne laser (wavelength: 632.8 nm) is employed and a photosensitive material sensitive to the laser beam emitted from the laser is used.

Referring to FIG. 23, when the exposure by the first laser is modulated between three levels: 0, $E_1/3$ and $E_1$, and the exposure by the second laser is modulated between three levels: 0, $E_2/3$ and $E_2$, the density of the image varied in nine degrees 0 (ground density) to 8. In a general expression, when the number of lasers is n, and the number or modulation levels including level 0 is k, the duplicate recording effect of the laser beams provides a number of degrees of gradation of $N = n^k$. Accordingly, the image can be expressed in gradation using a D/A converter of a small bit capacity, or without using any D/A converter when the number of modulation levels is two. Such possibility is particularly advantageous in regulating the gradation of an image by directly modulating a semiconductor laser, because the direct modulation of a semiconductor laser in a large modulation levels is very hard.

B. When a plurality of lasers which are different in wavelength are employed as the lasers, and a plurality of laser beams of different wavelengths are used, the image recording apparatus has the following advantages.

Referring to FIG. 4, a plurality of R-lasers, a plurality of G-lasers and a plurality of B-lasers are provided and each of R-laser beams, G-laser beams and B-laser beams is modulated by each of AOM drivers, respectively.

Referring to FIG. 5, each of a plurality of a R-laser beams, a plurality of G-laser beams and a plurality of B-laser beams are separated from each of R-laser beam, G-laser beam and B-laser beam with dichroic mirrors, and then each of the separated laser beams is modulated by each of AOM drivers, respectively.

Since an image can be formed in a large number of degrees of gradation even when each color laser beam is modulated in a small number of modulation levels for the reason similar to the effect described in A-(1), the image can be expressed in multiple colors. Such an effect is particularly advantageous in forming a color image by using semiconductor lasers which emit laser beams of different wavelengths, respectively.

An image recording apparatus, in a second embodiment, according to the present invention will be described hereinafter.

In FIG. 7, the image recording apparatus is embodied in a color laser printer capable of recording an image in red (R), green (G) and/or blue (B) and provided with three synchronizing clock generating circuits shown in FIG. 20 for an R-laser beam, a G-laser beam and a B-laser beam, respectively. Shown in FIG. 7 are synchronizing clock generating circuits 40, 50 and 60 respectively for a B-laser beam, a G-laser beam and a R-laser beam. The synchronizing clock generating circuit 40 for a B-laser beam comprises an N-ratio divider 41 which receives a clock of 60 MHz, a counter 42 which receives the output of the N-ratio divider 41, and a PROM 43 which receives the output of the counter 42 as an address and storing clock patterns (dividing ratios $N_1$, $N_2$ and $N_3$) for correcting deviation of the spots. The PROM 43 gives a signal to the N-ratio divider 41 to determine a dividing ratio. For example, when 0, 1 or 2 is applied to the load input terminal of the N-ratio divider 41, the dividing ratio of the N-ratio divider 41 is 16, 15 or 14, respectively. A B-laser beam detection signal is applied to the respective reset terminals of the N-ratio divider 41 and the counter 42 as a reset pulse. The respective constitutions of the synchronizing clock generating circuit 50 for green and the synchronizing clock generating circuit 60 for red are the same as that of the synchronizing clock generating circuit 40 for blue.

Suppose that the dividing ratios of each N-ratio dividers are $N_1=14$, $N_2=15$ and $N_3=16$. When the dividing ratios $N_1$ and $N_3$ are greatly different from the dividing ratio $N_2$, excessive correction will result.

The manner of operation of the synchronizing clock generating circuit thus constituted will be described hereinafter with reference to time charts shown in FIGS. 8(a) to 8(f). Since the three synchronizing clock generating circuits 40, 50 and 60 respectively for blue, green and red are the same in the manner of operation, the manner of operation of the synchronizing clock generating circuits will be described with reference to the synchronizing clock generating circuit 40 for blue.

When a laser beam detection signal (FIG. 8(a)) provided by a laser beam detector (not shown) is given to the synchronizing clock generating circuit 40, the respective outputs of the N-ratio divider 41 and the counter 42 are cleared (FIGS. 8(c) and 8(e)). Upon the fall of the laser beam detection signal, the N-ratio divider starts dividing a clock a of 60 MHz (FIG. 8(b)). The initial value of the output of the PROM 43 is zero. Upon the rise of the output of the N-ratio divider 41 as shown in FIG. 8(c), the counter 42 counts up by one and the output of the counter 42 rises as shown in FIG. 8(e). When the output of the counter 42 rises, the input address of the PROM 43 changes and the PROM 43 gives "1" to the N-ratio divider 41 and thereby the count of the N-ratio divider 41 becomes "15". Then, the N-ratio divider 41 applies a carry signal C as shown in FIG. 8(d) to the load terminal LD thereof to load a load input "1". Consequently, the dividing ratio of the N-ratio divider 41 is set to a dividing ratio (15) corresponding to the load input "1". Upon the rise of the N-ratio divider 41 as shown in FIG. 8(c), the output of the counter 42 falls as shown in FIG. 8(e). Then, the PROM 43 provides "0". When the next carry signal C is applied to the load terminal LD of the N-ratio divider 41, the N-ratio divider 41 is loaded with "0" and thereby the dividing ratio of the N-ratio divider 41 is set to a dividing ratio (16) corresponding to the load input "0". When the output of the N-ratio divider 41 rises again, the output of the counter 42 falls and thereby the PROM 43 provides "2". When the next carry signal C is given, the N-ratio divider 41 is loaded with "2" and thereby the dividing ratio of the N-ratio divider 41 is set to a dividing ratio (14) corresponding to "2". Thus, the synchronizing clock is regulated arbitrarily according to the output of the PROM to correct deviation of the spots caused by the lens.

Although the color laser beams are detected individually and separate laser beam detection signals for blue, green and red are provided in this embodiment, the laser beam detection signal of only one particular laser beam may be used if the deviation of the spots of the laser beams can be corrected in a range between the position detecting sensor and the effective image area (left margin), which will be described more specifically hereinafter. In FIG. 7, the R-laser beam detection signal, for instance, is used also as a B-laser beam detection signal and a G-laser beam detection signal. Suppose that the respective spots of the laser beams are in an arrangement as shown in FIG. 9 at a position corresponding to the position detecting sensor. When the R-laser beam detection signal is used, the three laser beams are made to coincide with each other at the image write starting position by the combination of the number of picture elements of the left margin and the above-mentioned correction. In the case of FIG. 9, for example, when the left margin for the R-laser beam corresponds to a clock count of 100, clock counts for the G-laser beam and the B-laser beam are 102 and 98, respectively. Furthermore, dislocations $\Delta t_1$ and $\Delta t_2$ are corrected by the method of deviation of the spots correction. Still further, when an Optional color laser beam is used as a reference laser beam, other two color laser beams may be brought into coincidence with the reference laser beam. Therefore, the PROM need not store clock patterns for all the color laser beams, and clock patterns only for two color laser beams may be stored in the PROM.

An image recording apparatus, in a fourth embodiment, according to the present invention will be described hereinafter. FIG. 10 shows the constitution of the essential portion of the image recording apparatus, in which a R-laser beam is used as a reference laser beam.

Referring to FIG. 10, a synchronizing clock generating circuit for a R-laser beam comprises only an N-ratio divider (15-ratio divider). The dividing ratios of the N-ratio dividers of synchronizing clock generating circuits for a G-laser beam and a B-laser beam are varied by PROMs, respectively.

A modification of the fourth embodiment will be described hereinafter. In some cases, irregular spots are formed along the feed direction when correction (regulation of the clock) is made with the same picture element in each line. Such irregular spots are shown in FIG. 11, in which shaded spots are irregular spots To obviate such irregular spots, picture elements to be corrected in each line are arranged random by forming each counting circuit shown in FIG. 1 by an upper counter and a lower counter as shown in FIG. 12 and applying the laser beam detection signal only to the reset terminal of the upper counter.

Thus, the values of the lower bits of each line are random and hence, when the lower bits are assigned to n pieces of bits, picture elements to be corrected among $2^n$ pieces of picture elements are distributed at random. The counting circuit may be loaded with random values provided by the laser beam detectors.

When the picture elements to be corrected and the picture elements not to be corrected are different from each other in gradation, another γ correction table may be prepared for picture elements which are divided at dividing ratios $N_1$, $N_2$ and $N_3$.

The variation of the fθ characteristics of the fθ lens and the deviation of the spots may be corrected simultaneously.

This embodiment is able to realize the optional patterns of dividing ratios stored in the PROM and to regulate the clock at the accuracy of the original oscillation, and is manufactured at a low cost.

A concrete example will be described hereinafter. Suppose that dividing ratios are 14, 15 and 16, the dividing ratio 15 is the standard dividing ratio, R-laser beam is the reference laser beam as shown in FIG. 13, an image height (scanning signal) from the center of the fθ lens is Y, Y=30 mm for the R-laser beam, B-laser spot is −50 μm with respect to a point corresponding to Y=30 mm (before the R-laser spot as shown in FIG. 19(a), and G-laser spot is +70 μm with respect to the point corresponding to Y=30 mm (beyond the R-laser spot as shown in FIG. 19(b). When the pitch of the picture elements along the main scanning direction is 50 μm (20 dots/mm), the ratio is 16 and the picture element is $(14/15) \times 50 = 46.7$ μm when the dividing ratio is 14. Thus, the pitch can be varied by ±3.3 μm with respect to the standard pitch of 50 μm.

When the image height y=30 mm, the number of picture elements within the image height is 30×20=600. Accordingly, with B-laser spots, fifteen picture elements (50/3.3=15) among 600 picture elements are divided at the dividing ratio of 16 from 50μm. When dividing is executed at regular intervals, one picture element every forty picture element (2 mm) is divided at the dividing ratio of 16. With G-laser spots, twenty-one picture elements (70/3.3=21) are divided at the dividing ratio of 14. When dividing is executed at regular intervals, one picture element every twenty-eight picture elements are divided at the dividing ratio of 14. Thus, the three color laser beams are focused in a single spot at the point corresponding to Y=30 mm.

Thus, the dividing ratio for dividing the clocks is varied according to the output signal of the PROM to regulate the number of clocks, so that the color laser beams are focused in a single spot without using any expensive delay line.

Thus, this embodiment effectively corrects the chromatic aberration caused by the lens. This embodiment has further advantages as follows.

A. Deviation from the fθ characteristics of the fθ lens can be corrected. FIG. 24 shows the variation of distortion with image height. The present invention corrects distortion, namely, deviation from the fθ characteristics, which is inevitable in designing the lens and in processing the lens.

Figure 25:
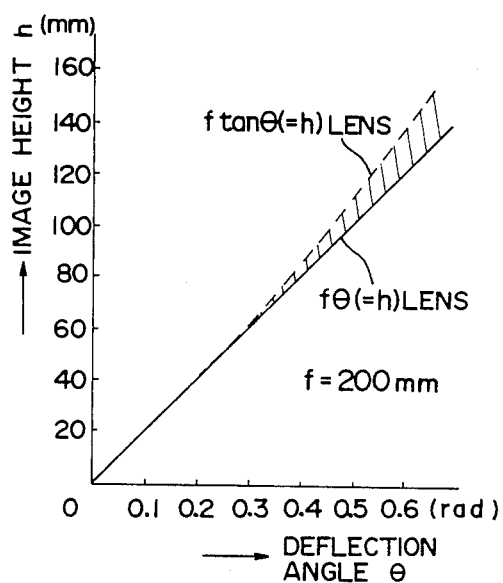
FIG. 25 a graph showing the relation between the deflecting and image eight of an $f\theta$ lens.

B. A lens other than the fθ lens can be made to exhibit the fθ characteristics at the focal plane. FIG. 25 shows the relation between image height and deflection angle θ for an fθ lens of f=200 mm and an ftanθ lens of f=200 mm. Shaded area is the deviation of the ftanθ lens from the fθ lens in image height h. Since the deviation can be corrected on the principle of the present invention, the ftanθ lens, which is less expensive than the fθ lens, is able to exhibit fθ characteristics on the focal plane. Naturally, the present invention is applicable to lenses other than the ftanθ lens.

Apparently, the advantages A and B of the present invention are effective also in a laser image recording apparatus using a plurality of laser beams of the same wavelength as well as in a laser image recording apparatus using a plurality of laser beams of different wavelengths.

In FIGS. 4 and 5, the optical systems are arranged so as to collect a plurality of beams in a single beam, so that the respective spots of the beams are not separated completely from each other on the focal plane. When the spots are not separated completely from each other the complete separation of pulses as shown in FIG. 3(b) is impossible and hence the regulation of image write starting timing is impossible, which deteriorates the quality of the image remarkably. Assembling the image recording apparatus so that the respective spots of the laser beams are separate from each other is difficult. That is, it is difficult to separate the spots from each other intentionally by a small distance to enable the beam detecting means to discriminate the spots. On the other hand, it is important to dispose the polygonal rotating mirror and the fθ lens correctly to meet a predetermined condition. If the center of rotation of the polygonal rotating mirror is dislocated relative to the optical axis of the fθ lens, the scanning distances of the beam to the right and to the left with respect to the optical axis are different from each other.

Figure 26A:
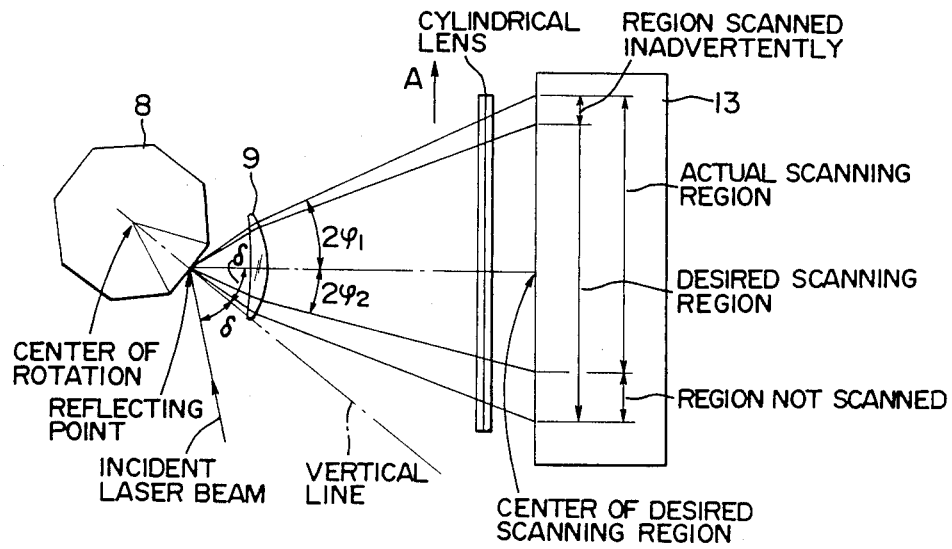
FIGS. 26(a) and 26(b) are views showing the disposition of a polygonal rotating mirror.

Accordingly, in the conventional laser image recording apparatus equipped with either a single laser or a plurality of lasers, the polygonal rotating mirror is disposed with the center of rotation on a perpendicular to the reflecting surface at the reflecting point on the polygonal rotating mirror, namely, on the bisector of an angle between the incident beam and the reflected beam, when the angle of rotation of the polygonal rotating mirror is determined so that the reflected beam fall on the focal plane at the center of the scanning region as shown in FIG. 26(a).

Separation of the spots of the beams properly from each other can be achieved by separating the parallel beams falling on the polygonal rotating mirror from each other in a direction perpendicular to the beams. However, separation of the parallel beams entails substantially the same undesirable effect as that accompanying the dislocation of the center of rotation of the polygonal rotating mirror, namely, the difference in scanning distance between the right and left scanning regions with respect to the center of the scanning region. For example, when the beams are separated from each other by 1.37 mm, a deflection angle $2\phi_1$ on one side is 34.72° and that $2\phi_2$ on the other side is 25.76°, in FIG. 26(a).

That is, the parallel separation of the beams falling on the polygonal rotating mirror causes the variation of the spot size of the beam between the right end and the left end of the scanning region, causes, in some cases, to fail to record the peripheral part of an image, and requires increase in the size of the polygonal rotating mirror and in the capacity of the lasers when the beam deflecting angle of the polygonal rotating mirror is increased to obviate failing in recording the entire image.

Referring to FIG. 26(a), failure to scan the entire scanning region due to the deviation of the center of an actual scanning region from the center of a desired scanning region may be obviated by shifting the desired scanning region, namely, a region provided with the photosensitive material, by a necessary distance in a direction indicated by an arrow A. However, since the incident angle of the beam on the cylindrical lens varies between one end and the other end of the cylindrical lens varying the diameter and shape of the spot of the beam between the opposite ends of the scanning region when the desired scanning region is shifted, the quality of the recorded image is deteriorated. Furthermore, when the spot size of the beam on the recording surface is reduced for recording in a high resolution, the depth of focus of the lens needs to be reduced, which makes it difficult to maintain the diameter and shape of the spot of the beam constant over the entire scanning region.

Figure 27:
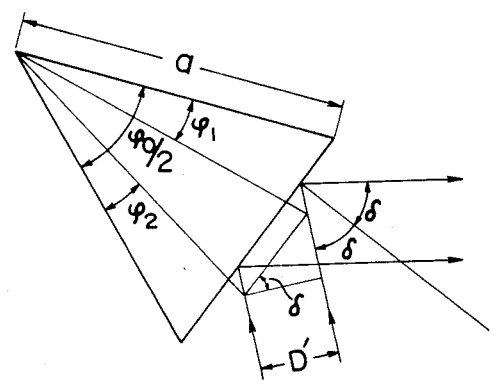
FIG. 27 is an enlarged fragmentary view of a polygonal rotating mirror.

The disagreement of the center of the desired scanning region and that of the actual scanning region is caused because only an area of the reflecting surface of the polygonal rotating mirror corresponding to the angle of rotation $\phi_1 + \phi_2$ in which a laser beam of D' in diameter is not vignetted by the edges of the reflecting surface of the polygonal rotating mirror contributes to forming an image and the laser beam falls on the reflecting surface at an angle of incidence $\delta$ as shown in FIG. 27.

It is also possible to secure the entire scanning region by increasing the deflection angle of the polygonal rotating mirror. The deflection angle of the polygonal rotating mirror can be increased by reducing the number of facets of the polygonal rotating mirror or by increasing the diameter of the polygonal rotating mirror. However, the former method entails the reduction of recording speed, while the latter entails increase in the size and cost of the image recording apparatus. Furthermore, increase in the deflection angle of the polygonal rotating mirror increases the ineffective scanning region wasting the energy of the laser beam, and hence the recording speed of the image recording apparatus is reduced when the image recording apparatus is provided with lasers of a comparatively low output capacity or the energy consumption rate of the image recording apparatus is increased.

To solve the foregoing problems, the following means are applicable individually or in combination.

(1) Determining the relation between the center of rotation of the polygonal rotating mirror and the optical axis of the $f\theta$ lens. This means is effective for an image recording apparatus using a single beam for scanning as well as for an image recording apparatus using a plurality of beams for scanning.

(2) Making a plurality of beams fall on the polygonal rotating mirror at different angles of incidence, respectively. This means is effective even when the plurality of beams are the same in wavelength.

(3) Making a plurality of beams be reflected at the same reflecting point with respect to the optical axis on the reflecting surface of the polygonal rotating mirror. The reflecting point may vary in the axial direction of the polygonal rotating mirror.

(4) Making a beam of smaller wavelength fall on the reflecting surface of the polygonal rotating mirror at a smaller angle of incidence as compared with the angle of incidence of a beam of larger wavelength.

1. Changing the Angle of Incidence

Figure 28:
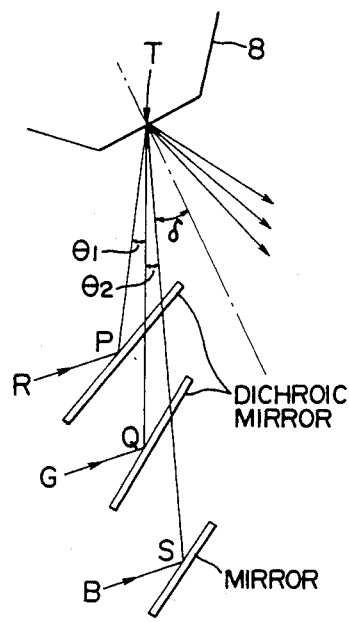
FIG. 28 to 30 are views of assistance in explaining a manner of varying incident angle.

A. Concentration of Beams at One Point on the Reflecting Surface of a Polygonal Rotating Mirror:

(a) Dichroic mirrors are disposed immediately before the polygonal rotating mirror as shown in FIG. 28. The dichroic mirrors are disposed so that angles PTQ and QTS coincide with desired angles, respectively. In assembling the image recording apparatus, the respective tilt angles of the dichroic mirrors are adjusted so that the beams are concentrated at a point T on the reflecting surface of the polygonal rotating mirror. Since the dichroic mirror for reflecting the R-beam transmits the G-beam and the B-beam while the dichroic mirror for reflecting the G-beam transmits the B-beam, the angles PTQ and QTS may be small.

Figure 29:
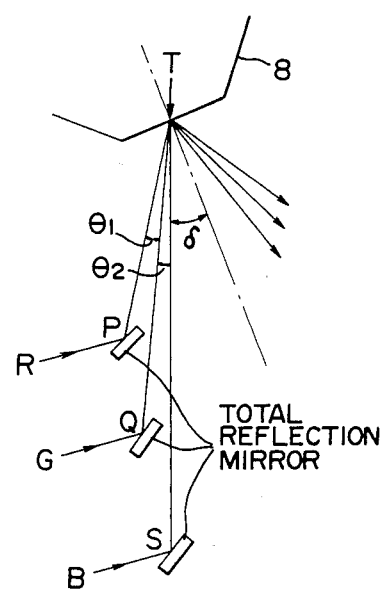
Figure 30:
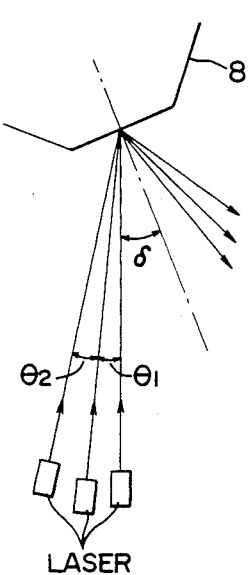

(b) The dichroic mirror is expensive and is subject to deformation because the dichroic mirror is thin, for example, 1 mm in thickness, and is large in area, for example, 30 mm in diameter. If the dichroic mirror is warped, the distribution of quantity of light in the beam becomes irregular and hence the beam is unable to be focused on the focal plane in a spot of a desired diameter. An ordinary mirror capable of total reflection is inexpensive and thick and is hardly deformed. When the angles PTQ and QTS are large, the G-beam and the B-beam are not intercepted by the mirror for the R-beam as shown in FIG. 29.

(c) Elimination of Dichroic Mirrors: Dichroic mirrors bring about the following problems.

(1) Expensive dichroic mirrors and the mirror holders each incorporating an expensive fine angle adjusting mechanism increase the cost of the image recording apparatus.

(2) Perfectly fixing the dichroic mirror in place is impossible. If the dichroic mirror is fixed adhesively by an adhesive, the dichroic mirror is liable to deform under the influence of temperature variation and to be dislocated by vibration, and readjustment of the dichroic mirror, which is necessary when the corresponding laser is broken and the same is replaced with another, is very difficult.

The foregoing problems are solved when dichroic mirrors and mirrors are eliminated. When the angles PTQ and QTS are large as shown in FIG. 29, the lasers can be disposed so as to project beams directly on the reflecting surface of the polygonal rotating mirror. Employment of small and inexpensive semiconductor lasers is particularly advantageous in forming the image recording apparatus in a compact construction at a low cost as well as in solving the foregoing problems.

Figure 26B:
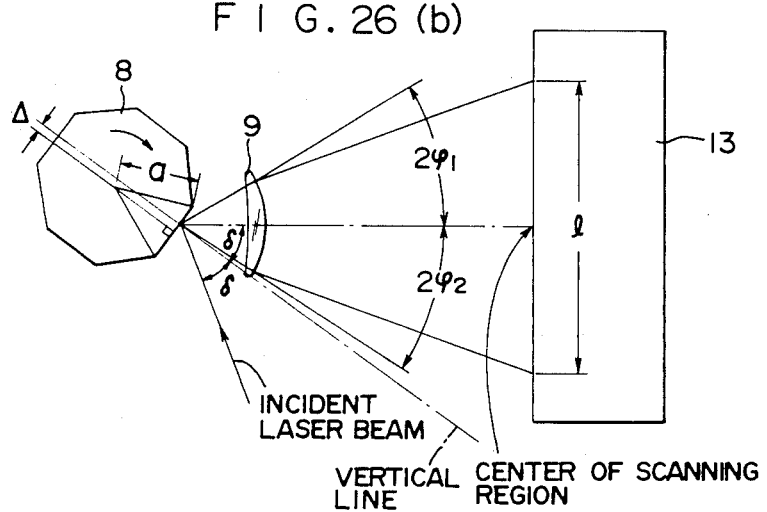

B. Making the Center of the Actual Scanning Region Coincide with the Center of the Desired Scanning Region Referring to FIG. 26(b), when the center of the polygonal rotating mirror is shifted in a direction perpendicular to a perpendicular on the reflecting surface of the polygonal rotating mirror by a distance $\Delta$, since $$\sin(\phi_0/4 - \phi_1 + \delta) = D'/2a + \sin\delta \cdot \cos\phi_0/4 + \Delta/a \cdot \cos\delta \quad (1)$$

$$\sin(\phi_0/4 - \phi_2 - \delta) = D'/2a - \sin\delta \cdot \cos\phi_0/4 - \Delta/a \cdot \cos\delta \quad (2)$$

a condition for deflecting the beam at the same angle on the opposite sides of the center of deflection, namely, a line passing the reflecting point on the reflecting surface of the polygonal rotating mirror and the center of the scanning region, is $$\phi_1 = \phi_2 \quad (3)$$

That is, when the center of the polygonal rotating mirror is shifted by a distance $\Delta$ meeting Expressions (1) and (2), $$\phi_1 = \phi_2 = \phi_0/4 - \sin^{-1}(D'/2a \cdot \cos\delta) \quad (4)$$

EXAMPLE

When $D' = 8.0$ mm, $a = 35.18$ mm, $\delta = 30°$ and $\phi_0 = 90°$, $\phi_1 = \phi_2 = 14.96°$ from Expression (4), therefore, from Expressions (1) and (2), $\Delta = 1.37$ mm.

It is to be noted that the angles $\phi_1$ and $\phi_2$ are dependent on the diameter $D'$ of the beam. For example, from Expression (4), $\phi_1 = \phi_2 = 16.85°$ when $D' = 6.0$ mm. That is, the deflection angles $\phi_1$ and $\phi_2$ decrease as the value of $D'$ increases.

The magnitude of $D'$ will be examined hereinafter.

Generally, in focusing parallel laser beams of $D'$ in diameter, the diameter d of the beam waist, namely, the spot size of the narrowest part of the laser beams, is given by:

$$d = \Delta \delta f / \pi D' \quad (5)$$

where $\delta$ is the wavelength of the laser beam and f is the focal length of a convex lens.

Therefore, to focus laser beams of different wavelengths in spots of the same spot size d, the value of $D'$ must be large for a laser beam of large wavelength and must be small for a laser beam of small wavelength. The convex lens corresponds to an $f\theta$ lens herein. Ordinarily, since parallel beams fall on the $f\theta$ lens, the beams falling on the polygonal rotating mirror are the same in diameter $D'$. Since the laser beams of different wavelengths must be different also in diameter $D'$, it is impossible to determine a single $\Delta$ optimum for all the laser beams. Since the greater is $D'$, the smaller are $\phi_1$ and $\phi_2$, and smaller is the deflection angle, the beam having a small $D'$ is surely able to cover the desired scanning region when a distance $\Delta$ optimum for the beam having the largest diameter $D'$ is chosen, so that the quality of the image is not deteriorated significantly and the energy of the laser beams is used efficiently.

Figure 31:
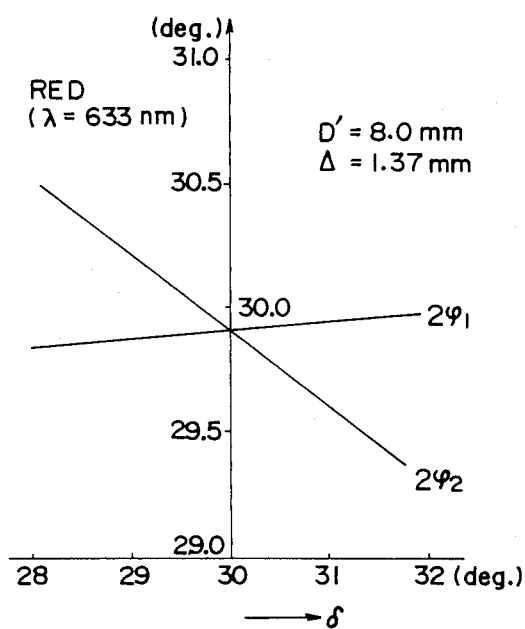
FIGS. 31 to 33 graphs of assistance in explaining a manner of varying angle of incidence.
Figure 32:
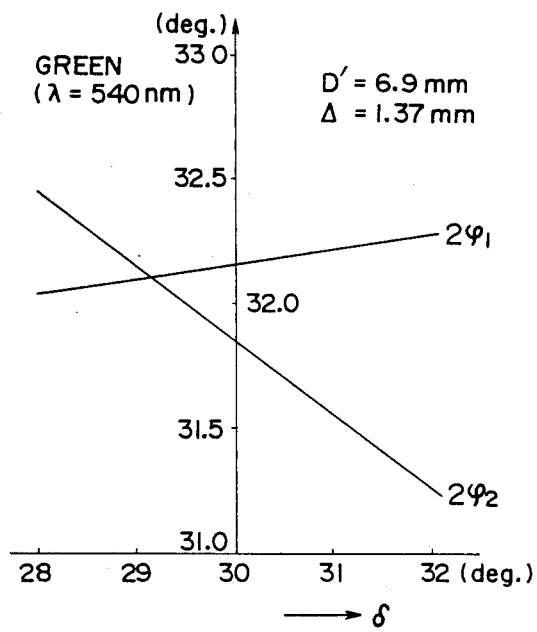
Figure 33:
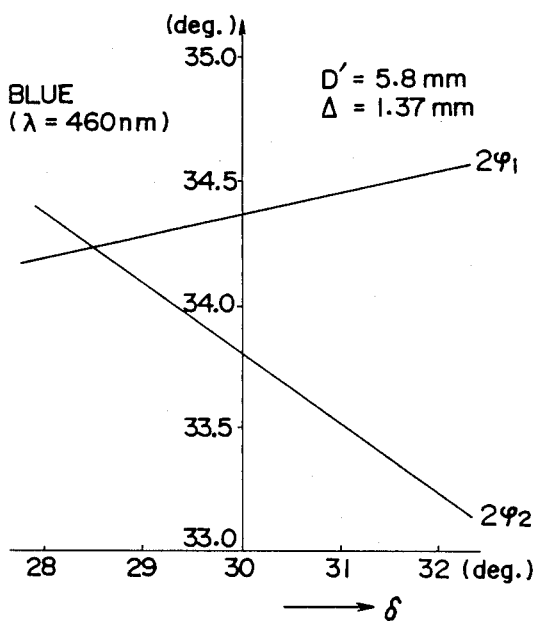

FIGS. 31 to 33 are graphs showing the relation between $\delta$ and angles $2\phi_1$ and $2\phi_2$ which give $\Delta = 1.37$ mm when $D' = 8.0$ mm, for a R-laser beam (D = 8.0 mm), a G-laser beam (D = 6.9 mm) and a B-laser beam (D = 5.8 mm).

As shown in FIG. 31, $2\phi_1 = 2\phi_2$ for the R-laser beam when $\delta = 30°$. Although $2\phi_1 \neq 2\phi_2$ for the G-laser beam and the B-laser beam as shown in FIGS. 32 and 33 when $\delta = 30°$, the values of $2\phi_1$ and $2\phi_2$ for the G-laser beam and the B-laser beam are apparently greater than those for the R-laser beam and hence the G-laser beam and the B-laser beam are able to cover the entire scanning region of the R-laser beam.

2. Magnitude of Angle of Incidence $\delta$

Appropriate angles of incidence of the laser beams when the value of $\Delta$ is decided on the basis of the laser beam having the greatest $D'$ will be examined hereunder.

(1) Referring to FIGS. 31, 32 and 33, when the angle of incidence $\Delta$ is changed, change in $\phi_1$ is small while change in $\phi_2$ is large. If both $\phi_1$ and $\phi_2$ are reduced, failure in scanning the entire scanning region is possible. Therefore, it is desirable to reduce $\phi_1$ which is less affected by change;

Accordingly, it is preferable to reduce the angle of incidence $\delta$, because when the angle of incidence $\delta$ is reduced, the reduction amount of $\phi_1$ becomes small, but $\phi_2$ is increased.

(2) Reduction of the angle of incidence $\delta$ reduces the difference between $\phi_1$ and $\phi_2$.

(3) Since $\phi_1$ and $\phi_2$, for a laser beam being greater in $D'$ are greater than those for a laser beam being smaller in $D'$, it is preferable to reduce the angle of incidence $\delta$ of a laser beam being smallest in $D'$ than the others.

3. Amount of Change of Angle of Incidence $\delta$ (a). Minimum Value of Change:

It is necessary that the scanning synchronizing signal shown in FIG. 3(b) is provided on the basis of the beam detection signal shown in FIG. 3(a) when a plurality of laser beams pass across the single horizontal synchronizing sensor. However, when $T_1$ and $T_2$ are small, it is difficult to obtain a scanning synchronizing signal having exactly distinguishable pulses of a number equal to the number of the lasers. Minimum values of $T_1$ and $T_2$ are dependent on the sensitivity of the horizontal synchronizing sensor and/or the intensities of the laser beams, the main scanning speed of the laser beams, and are on the order of 1 $\mu$sec ($1 \times 10^{-6}$ sec). Change of the angle of incidence corresponding to $T_1 = T_2 = 1$ $\mu$sec can be calculated numerically as follows.

When the frequency of the picture element clock (recording frequency of dots along the main scanning direction) is 4 MHz, and the pitch of the picture elements is 0.05 mm, movement of a spot in 1 $\mu$sec is 0.05 mm $\times 1 \times 10^{-6}/(1/(4 \times 10^6))$sec = 0.2 mm. Thus, $L_1$ and $L_2$ (FIG. 2) are 0.2 mm.

When the focal length f of the $f\theta$ lens is 350 mm, $\theta_1 = \theta_2$ 0.2 mm/350 mm = 0.00057 rad = 0.033°.

When the angle between the R-laser beam and the G-laser beam is $\theta_1$ and the angle between the B-laser beam and the G-laser beam is $\theta_2$, as shown in FIG. 2, the changes of angles of incidence (FIG. 34) are $\theta_1$ and $\theta_2$.

Figure 34:
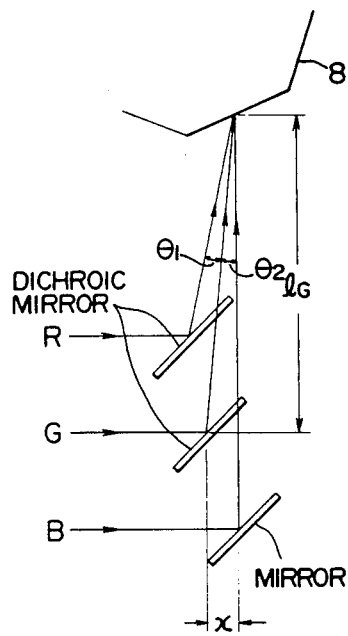
FIG. 34 is a diagrammatic view of assistance in explaining the of incident angle.

Referring to FIG. 34, when the angle $\theta_2$, between the G-laser beam reflected by the dichroic mirror and the B-laser beam reflected by the dichroic mirror is 0.033° and the distance $l_G$ (vertical distance as viewed in FIG. 34) between the reflecting point on the polygonal rotating mirror and the reflecting point on the dichroic mirror for G-laser beam is 200 mm, the distance x (horizontal distance as viewed in FIG. 34) between the reflecting point on the dichroic mirror for the G-laser beam and the reflecting point on the dichroic mirror for the B-laser beam is $$\chi = l_G \tan\theta_2 = 200 \cdot \tan 0.033 = 0.12 \text{ mm}$$

It is difficult to dispose the dichroic mirrors accurately with such a small distance of 0.12 mm therebetween. Desirably, the distance $l_G$ is on the order of 1 mm. However, when x = 1 mm, the distance $l_G$ is as large as 2000 mm, which inevitably increases the size of the image recording apparatus. Accordingly, it is advantageous to increase $\theta_1$ and $\theta_2$ to the largest possible values from the viewpoint of machining accuracy, assembling accuracy and the size of the image recording apparatus.

(b) Maximum Value of Change:

Referring to FIGS. 32 and 33, when $\phi_1 = \phi_2$, the center of an actual scanning region can be made to coincide with the center of a desired scanning region.

From FIG. 32, when $\phi_1 = \phi_2$, $\delta = 29.16°$, hence $\theta_1 = 0.84°$ (30° − 29.16°).

From FIG. 33, when $\phi_1 = \phi_2$, $\delta = 28.51°$, hence $\theta_2 = 0.65°$ (29.16° − 28.51°).

From FIG. 34, $\chi = l_G \tan\theta_2 = 200 \cdot \tan 0.65° = 2.26$ mm. The value $x = 2.26$ mm is a feasible value in respect of machining accuracy and assembling accuracy.

Further increase of the value of change is possible, however, the extent of increase is dependent on the allowable angle of incidence on the $f\theta$ lens.

The maximum and minimum values of change of the angle of incidence have been calculated numerically merely by way of example. In brief, (1) the minimum value shall not be smaller than the smallest limit value ensuring a scanning synchronizing signal having distinguishable pulses shown in FIG. 3(b), and (2) the maximum value shall be the largest limit value which will not provide $2\phi_1$ and $2\phi_2$ which are smaller than an allowable angle of incidence on the $f\theta$ lens.

The lasers need not necessarily be gas lasers, semiconductor lasers or a laser such as a He-Cd white laser capable of emitting a laser beam including a plurality of laser rays of different wavelengths may be employed.

Furthermore, although the invention has been described as applied to image recording apparatus using three color laser beams, the number of color laser beams need not be limited to three and a plurality of laser beams of the same wavelength may be used.

Figure 35:
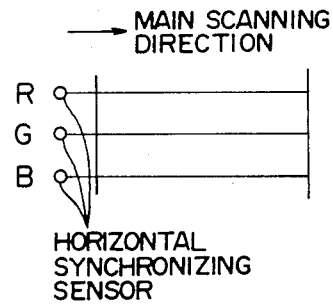
FIG. 35 is a view showing the relative positions of laser beams.

Still further, although the invention has been described on an assumption that all the laser beams travel in the same plane, the laser beams may travel in different planes. For example, horizontal synchronizing sensors may be accurately arranged along a vertical line to make the laser beams travel across the horizontal synchronizing sensors, respectively, as shown in FIG. 35.

The incident laser beams on the polygonal rotating mirror need not necessarily be parallel beams.

The direction of rotation of the polygonal rotating mirror is optional provided that the laser beam reflected by the polygonal rotating mirror travel across the horizontal synchronizing sensor before falling on the image recording surface. The polygonal rotating mirror may be substituted by a galvano mirror or hologram scanner.

What is claimed is:

1. An image recording apparatus for recording an image on a photosensitive material by the simultaneous scanning operation of a plurality of laser beams separated along a scanning direction, which comprises:

beam detecting means for generating a beam detection signal when each of said plurality of laser beams falls incident on said beam detecting means;

a synchronizing signal generating circuit which, upon the reception of a beam detection signal from said beam detecting means, provides a waveform-shaped scanning synchronizing signal for each one of said laser beams;

a plurality of picture element clock generating circuits for receiving the scanning synchronizing signal and a clock signal of a frequency that is an integral multiple of the frequency of a predetermined picture element clock signal, and for dividing the clock signal from the time of reception of the scanning synchronizing signal to provide a plurality of picture element clock signals;

a plurality of margin counting circuits which receive the plurality of picture element clock signals from said plurality of picture element clock signal generating circuits, respectively, at the completion of counting a predetermined number of picture elements;

a plurality of image generating circuits which generate image signals upon the reception of the count completion signals from said counting circuits; and a plurality of drivers for modulating the intensity of said plurality of laser beams in response to said image signal.

2. An image recording apparatus for recording a color image on a color photosensitive material by the simultaneous scanning operation of a plurality of laser beams of different wavelengths separated along a scanning direction, which comprises:

beam detecting means for generating a beam detection signal when each of said plurality of laser beams falls incident on said beam detecting means;

a synchronizing signal generating circuit which, upon the reception of a beam detection signal from said beam detecting means, provides a waveform-shaped scanning synchronizing signal for each one of said laser beams of different wavelengths;

a plurality of picture element clock generating circuits for receiving the scanning synchronizing signal and a clock signal of a frequency that is an integral multiple of the frequency of a predetermined picture element clock signal, and for dividing the clock signal from the time of reception of the scanning synchronizing signal to provide a plurality of picture element clock signals;

as plurality of counting circuits which receive the plurality of picture element clock signals from said plurality of picture element clock signal generating circuits, respectively, and provide count completion signals, respectively, at the completion of counting a predetermined number of picture elements;

a plurality of image generating circuits which generate image signals upon the reception of the count completion signals from the counting circuits; and a plurality of drivers for modulating the intensity of said plurality of laser beams in response to said image signal.

3. An image recording apparatus for recording an image on a photosensitive material by the scanning operation of a plurality of beams separated along a main scanning direction, which comprises:

optical deflecting means for scanning said laser beams on a recording and scanning surface;

beam detecting means for detecting a time of passage of each laser beam and generating a detection signal in response thereto;

a plurality of picture element clock generating means corresponding to each one of said plurality of laser beams for generating picture element clock signals synchronized with said detection signals generated by said beam detecting means on the basis of said detection signals; optical modulating means for modulating the intensity of the laser beam; and a plurality of image signal generating means corresponding to each of said plurality of laser beams for applying an image signal to said optical modulating means after the picture element clock signal from said picture element clock generating means is received and a predetermined number of picture elements are counted, said image signal being synchronized with said picture element clock signal.

4. An image recording apparatus according to claim 3, wherein said picture element clock generating means comprises memory means for storing an information of a dividing ratio for each picture element clock and a frequency divider for varying the dividing ratio of the clock signal having a frequency that is an integral multiple of the frequency of the picture element clock signal generated from an oscillator according to an output of said memory means.

5. An image recording apparatus as recited in claim 1, 2, or 3, wherein a control means for controlling the record starting timing is provided for each of one of the plurality of laser beams.

6. An image recording apparatus as recited in claim 1 2, 3, further including optical deflecting means and means for separating said laser beams from each other by projecting said laser beams on said optical deflecting means at different angles of incidence.

7. An image recording apparatus as recited in claim 1,2,3, wherein said optical deflecting means is a rotatable polygonal mirror.

8. An image recording apparatus according to claim 2, wherein said picture element clock generating circuit comprises:

memory means for storing a dividing ratio; and a frequency divider for dividing said clock signal by said dividing ratio.

9. An image recording apparatus according to claim 1, wherein said beam detecting means includes a single detector and said synchronizing signal generating circuit includes a discriminating for identifying which of said plurality of laser beams is detected by said single detector.

10. An image recording apparatus according to claim 1, wherein said beam detecting means includes a plurality of detectors, each of said detectors corresponding to a different one of said plurality of laser beams.

11. An image recording apparatus according to claim 2, wherein said beam detecting means includes a single detector and said synchronizing signal generating circuit includes a discriminating circuit for identifying which of said plurality of laser beams is detected by said single detector.

12. An image recording apparatus according to claim 2, wherein said beam detecting means includes a plurality of detectors, each of said detectors corresponding to a different one of said plurality of laser beams.

13. An image recording apparatus according to claim 1, wherein said plurality of laser beams emit radiation of the same wavelength and said plurality of drivers modulate each of said plurality of laser beams between a plurality of levels of intensity.

14. An image recording apparatus as recited in claim 3, wherein said plurality of laser beams are different in wavelength from one another.

15. An image recording apparatus as recited in claim 3, wherein said plurality of laser beams are different in wavelength from one another, and record a color image on a color photosensitive member positioned in a record scanning surface.

* * * * *

UNITED STATES PATENT AND TRADEMARK OFFICE
CERTIFICATE OF CORRECTION

PATENT NO. : 4,862,196
DATED : August 29, 1989
INVENTOR(S) : Toshikazu Umeda et al.

It is certified that error appears in the above-identified patent and that said Letters Patent is hereby corrected as shown below:

Claim 3, column 20, line 55, "optical " should begin the next line.

Claim 7, column 21, line 17, "2,3" should be --2 or 3--.

Claim 9, column 21, line 30, "discriminating" should be followed by --circuit--.

Signed and Sealed this

Twenty-second Day of October, 1991

Attest:

HARRY F. MANBECK, JR.

*Attesting Officer*         *Commissioner of Patents and Trademarks*